Jan. 4, 1944.   J. MARTIN   2,338,192
CLOSURE DEVICE FOR HANDHOLES OR OPENINGS
Filed July 17, 1941   2 Sheets-Sheet 1
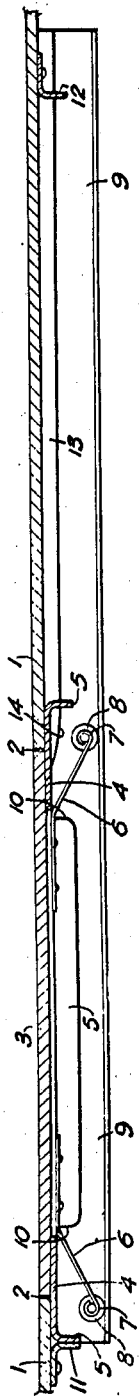
INVENTOR
James Martin
By Rayner & Co
ATTORNEYS Jan. 4, 1944. J. MARTIN 2,338,192
CLOSURE DEVICE FOR HANDHOLES OR OPENINGS
Filed July 17, 1941    2 Sheets-Sheet 2
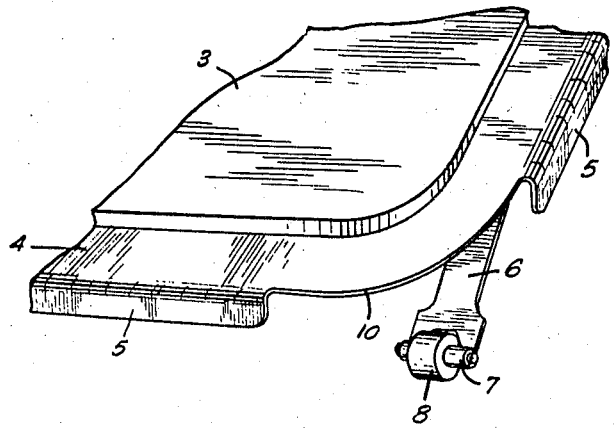
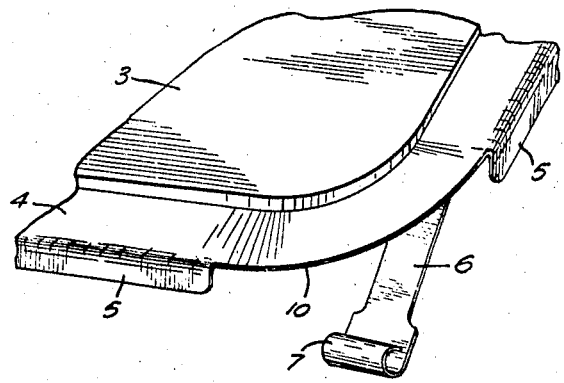
INVENTOR
James Martin
BY
ATTORNEYS.

Patented Jan. 4, 1944

2,338,192

UNITED STATES PATENT OFFICE 2,338,192

CLOSURE DEVICE FOR HANDHOLES OR OPENINGS

James Martin, Higher Denham, near Uxbridge, England

Application July 17, 1941, Serial No. 402,800
In Great Britain, August 7, 1940

3 Claims. (Cl. 220—41)

This invention relates to a closure device for hand-holes or openings which give access to filler caps of petrol and oil tanks on aircraft and for like purposes, e. g., for providing a flush and neat covering on motor road vehicles where it is required to obscure a filler cap and to obtain a neat, continuous surface to the part of the vehicle accommodating a petrol or oil tank. More particularly on aircraft is it desirable to obviate obstructions or projections which will interfere with the finish and streamlining of the aircraft, and the present invention has for its chief object to provide a closure device which will enable a petrol or oil tank compartment to be neatly sealed so as to obviate any protruding head, handles or other manipulating devices previously regarded as necessary for opening compartments to obtain the desired access to a tank filler cap, or any other suitable compartment.

In carrying one form of this invention into practice an aircraft wing section, fuselage or other convenient part is provided with an opening which is normally closed by a panel shaped to fit snugly within the said opening so as normally to lie in continuity with the outer surface of the wing or other part containing the said opening, said panel being formed with a flange at its perimeter normally abutting against the wing or other part of the aircraft or the like, a number of spring loaded or resiliently supported runners being carried by the panel or its flange and slidably supported by guide rails extending beneath the said opening and prolonged beyond the opening so that the panel can be depressed against the influence of the spring loaded or resiliently supported runners and pushed along the guide rails, a pair of longitudinal distance pieces forming abutments for the longitudinal flanges of the panel when the panel is located in a position beyond the said opening. Stops are provided to limit the sliding movements of the panel and are so located that one of the end flanges of the panel is accessible when the panel is in the fully opened position. The said longitudinal distance pieces prevent direct contact of the upper face of the sliding panel with the part of the aircraft or other structure beneath which it is located when in the open position, and the ends of these two distance pieces adjacent to the said opening are curved or inclined to enable the flanges of the panel to slide readily into and from the closed position.

In order that this invention may be clearly understood and readily carried into effect drawings are appended hereto illustrating embodiments thereof and wherein—

Fig. 1 is a sectional side elevation view showing the closure device in its closed position.

Fig. 2 is a sectional side elevation view showing the closure device being manipulated to the open position.

Fig. 3 is a sectional side elevation view showing the closure device when it has been manipulated to the fully open position.

Fig. 4 is a sectional end elevation on the line 4a—4a of Fig. 3.

Fig. 5 is a detail perspective view showing one corner of the slidable door, and Fig. 6 is a view similar to Fig. 5 but showing a modified form of resiliently supported runner.

Referring to the drawings the embodiment shown can be regarded as incorporated in part of an aeroplane, and for this purpose the sectioned portion 1 can be the covering of the wing, fuselage or other convenient part. However it will be understood that the part 1 can represent a convenient part of a motor road vehicle. In the cover 1 is provided an opening 2 preferably of oblong form with radiused corners, and fitting in this opening is a door or panel 3 corresponding in outline to the configuration of the opening, so that as shown in Fig. 1 this door or panel normally fits snugly in the opening 2 and with its upper face in continuity with the upper face of the fuselage or other part 1.

The opening 2 is disposed above the filler cap of a petrol or oil tank or other suitable device, and such opening is of such dimensions that an operator can freely insert a hand.

The door or panel 3 is held in the closed position by spring means which yieldingly resists depression of the door or panel, and it is preferred to combine with the spring means suitable runners for guiding the door or panel to and from the fully opened position. A convenient method of effecting this result is to fit to the base of the door or panel 3 a marginal flange which can be a sheet metal plate 4 secured by screws or rivets to the base of the door 3. The perimeter of this flange is curved or bent downwardly as at 5 to provide a smooth edge which will facilitate manipulation of the door as well as avoid sharp lateral edges liable to foul or injure adjacent structural parts.

As shown in the drawings this flange 4 forms a step with the primeter of the door 3, and normally abuts against the underside of the part 1 immediately surrounding the hole 2. The resilient means which presses the flange 4 in this closed position can comprise four leaf springs 6 secured by rivets or other suitable means to the flange 4, such leaf springs being inclined downwardly towards free ends which are coiled as at 7 to receive the spindles or spigots of four rollers 8. These rollers 8 engage a pair of longitudinal guide rails 9 each of substantially Z cross section so as to afford upper flanges 9a by which they are secured to the part 1.

To afford the requisite latitude of movement of the leaf springs 6 the corners of the downwardly turned parts 5 of the flanges 4 are cut away to form bays 10 as more clearly shown in Figs. 5 and 6. By this means the slidable device can be reasonably shallow and the rollers 8 can be within the perimeter of the flange 4. The guide rails 9 terminate at one end at an angle section transverse stop 11 adjacent to one transverse edge of the opening 2, and at the other end they terminate at or just beyond another angle section stop 12, these two stops limiting the sliding movement of the door or panel so that when the door or panel is in the fully open position one edge is close to the transverse edge of the hole 2 opposite to the transverse edge adjacent to the stop 11, and consequently it is a simple matter to engage the depending part of the flange 4 to pull the door or panel to the nearly closed position when it can be manipulated to the fully closed position by a light downward pressure of the hand whilst urging the door or panel towards the stop 11.

The flanges 4 also serve as a means for preventing the upper face of the door or panel 3 from frictionally engaging the lower surface of the part 1 of an aeroplane or the like, this being effected by providing a longitudinal pair of distance piece strips 13 along the under-face of the part 1 parallel with and immediately above the guide rails 9, the longitudinal parts of the flanges 4 sliding against these strips. The ends of these distance piece strips adjacent to the opening 2 are curved or inclined upwardly as indicated at 14 to facilitate the sliding of the panel or door to and from the closed position.

If desired, the rollers 8 may be replaced by any other suitable anti-friction devices, and as shown in Fig. 6 they may be entirely omitted and the rolled ends 7 of the leaf springs 6 relied upon to afford the requisite easy sliding engagement with the guide rails 9.

Where a highly effective seal is required the upper-face of the flange 4 and/or the lower face of the part 1 where it surrounds the hole 2 can be lined with rubber or other suitable material. Also if desired, the perimeter of the panel may be bevelled to firmly wedge in the opening 2.

It will be apparent that by means of the foregoing a flush fitting sliding door is provided which is particularly useful as a fitment to aircraft and other vehicles where it is desirable to minimise as much as possible projections liable to detract from the streamline effect of the vehicle, and that the device is particularly advantageous where a quick automatic locking in the closed position is required.

I claim:

1. In a closure device for an opening in a wall surface, the combination of, a panel shaped to close said opening, a flange projecting from the perimeter of said panel and normally abutting the underside of said wall surface, a pair of guide rails fastened to the underside of said wall surface and positioned parallel along two sides of said opening and extending beyond the opening, freely rotatable rollers adapted to be supported on said guide rails, and springs fixed to the underside of said flange and supporting said rollers, said springs normally pressing said panel into said opening but adapted to be depressed so as to permit said panel to slide on said rollers under said wall surface.

2. In a closure device for an opening in a wall surface, the combination of, a panel shaped to close said opening, a flange projecting from the perimeter of said panel and normally abutting the underside of said wall surface, a pair of guide rails fastened to the underside of said wall surface and positioned parallel along two sides of said opening and extending beyond the opening, freely rotatable rollers adapted to be supported on said guide rails, springs fixed to the underside of said flange and supporting said rollers, said springs normally pressing said panel into said opening but adapted to be depressed so as to permit said panel to slide on said rollers under said wall surface, a pair of strips fixed to the underside of said wall surface and extending parallel with said guide rails, said strips adapted to engage the upper surface of said flange to hold the panel out of contact with the underside of said wall surface.

3. In a closure device for an opening in a wall surface, the combination of, a panel shaped to close said opening, a flange projecting from the perimeter of said panel and normally abutting the underside of said wall surface, a pair of guide rails fastened to the underside of said wall surface and positioned parallel along two sides of said opening and extending beyond the opening, freely rotatable rollers adapted to be supported on said guide rails, springs fixed to the underside of said flange and supporting said rollers, said springs normally pressing said panel into said opening but adapted to be depressed so as to permit said panel to slide on said rollers under said wall surface, a stop adjacent the ends of said rails remote from said opening to limit the movement of said rollers on said rails.

JAMES MARTIN.